Figure 1:
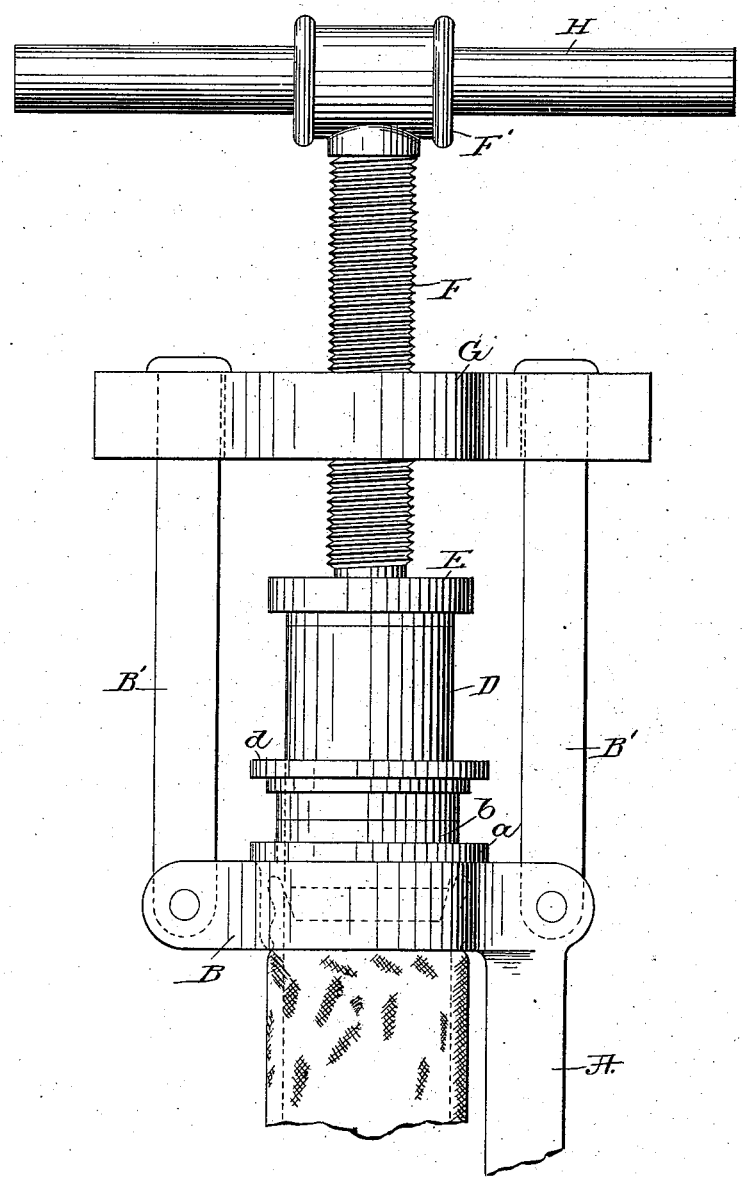

(No Model.)
2 Sheets—Sheet 1.

E. E. SIBLEY & C. ALLEN.
TOOL FOR APPLYING COUPLINGS TO HOSE.

No. 382,776. Patented May 15, 1888.

Witnesses.
Fred. S. Greenleaf
Fred L. Emery.

Inventor.
Edwin E. Sibley.
Charles Allen.
By Jernby & Gregory.
Attys.

(No Model.) 2 Sheets—Sheet 2.

E. E. SIBLEY & C. ALLEN.
TOOL FOR APPLYING COUPLINGS TO HOSE.

No. 382,776. Patented May 15, 1888.

Witnesses.
Howard F. Eaton.
Fred. L. Emery.

Inventor.
Edwin E. Sibley,
Charles Allen,
by Crosby & Gregory,
Attys.

UNITED STATES PATENT OFFICE.

EDWIN E. SIBLEY AND CHARLES ALLEN, OF CHELSEA, MASSACHUSETTS, ASSIGNORS TO THE AMERICAN FIRE HOSE MANUFACTURING COMPANY, OF SAME PLACE.

TOOL FOR APPLYING COUPLINGS TO HOSE.

SPECIFICATION forming part of Letters Patent No. 382,776, dated May 15, 1888.

Application filed December 3, 1887. Serial No. 256,892. (No model.)

*To all whom it may concern:*

Be it known that we, EDWIN E. SIBLEY and CHARLES ALLEN, both of Chelsea, county of Suffolk, State of Massachusetts, have invented an Improvement in Tools for Applying Couplings to Hose, of which the following description, in connection with the accompanying drawings, is a specification, like letters on the drawings representing like parts.

This invention is an improvement on that represented in United States Letters Patent No. 245,056, dated August 2, 1881, and has for its object to provide a tool whereby couplings may be applied to hose in a more speedy and efficient manner. In the patent referred to the outer "ring" or "binder," as it is called, of the hose-coupling is applied to the end of a woven or other hose, and thereafter a plug is inserted into the end of the said hose to a point beyond the inner end of the outer ring or binder to serve as a clamp or holder for the hose while a wedge-ring is being inserted into the end of the hose surrounded by the outer ring or binder. The plug referred to has a stem, which is struck by a hammer or mallet, to thereby drive the plug into the end of the hose and clamp the same. The wedge-ring referred to in the said patent was forced into the outer end of the hose by means of a follower made as part of a yoke, the said follower being slotted to receive screws which were attached to a clamp surrounding the outer ring or binder, the rotation of nuts placed upon the said screws forcing the follower down into the outer ring, the follower in turn, by its action on the wedge-ring, pushing the latter down along the surface of the ring, the plug remaining stationary.

In this present invention we have provided a stand which supports the outer ring or binder of the hose-coupling, the latter receiving within it the end of the hose, and thereafter a directing-plug has applied to it a wedge-ring, a follower, and a cap, and the plug is then inserted within the open end of the hose and a screw is made to act upon the cap and force the plug, follower, and wedge-ring into the hose. In this way it is possible to fit the wedge-ring better to the hose and to avoid the slipping of the hose in the outer ring or binder. In the patent referred to the outer ring or binder had at its lower end one inwardly-turned lip; but in the use of the said outer ring or binder much difficulty was experienced in properly retaining the hose in position while inserting the end of the plug. To overcome this difficulty, we have provided the inner side of the outer ring or binder with two lips or projections, having between them a concavity, into which the hose is pressed by the end of the plug, the two lips or projections acting to prevent any slipping of the hose in the outer ring or binder.

The hose-coupling herein shown forms the subject-matter of an application, Serial No. 257,098, filed December 6, 1887.

Figure 1, in perspective, shows our improved tool, with a wedge-ring almost forced into position. Fig. 2 is a vertical section of the tool shown in Fig. 1, but with the wedge-ring forced fully into the hose. Fig. 3 is a sectional elevation of part of the tool shown in Fig. 2, with the lifting-screw, its nut, and annular sleeve-like rest in position to effect the withdrawal of the plug from the hose. Fig. 4 is a section of Fig. 3 in the dotted line just at the top of the plug, and Fig. 5 represents the upper end of the plug.

The stand A, adapted to be secured to a vise or to be attached to a suitable bench, serves to sustain a binder-holder, B, consisting, as herein shown, of two nearly semicircular jaws having ears united by suitable bolts to form a clamp. This binder-holder and stand have suitably pivoted upon or with relation to them two headed links, as B', to be described.

The outer ring or binder, $a$, is set within the binder-holder B and suitably clamped therein. Next the end of the hose C is inserted within the outer ring or binder, $a$, the end of the hose being carried up, preferably, to the shoulder $a'$ within the said ring or binder. The wedge-ring $b$, follower $d$, and cap E are then applied to the plug D, and the latter is then passed into the open end of the outer ring or binder and into the end of the hose. Then the end of the screw F is rested upon the cap E, the links B' are turned to engage the nut G, and the screw is turned, forcing the plug into the hose and with it the follower and wedge-ring, the latter, directed by the plug, being forced down until the upper end of the wedge-ring is forced nearly to the shoulder $a'$, thus effectually clamping the hose end.

By leaving the outer end of the wedge-ring just outside the shoulder $a'$ the said ring is left in condition to be withdrawn.

The screw F has a head, F', which receives a handle, H.

The plug supports the wedge-ring as the latter is being forced into the ring by the follower; but, inasmuch as the plug moves with the said ring, the friction between the plug and ring is obviated. The plug is, however, forced into the hose with such great pressure that it can be removed only by a very strong pull. To enable this to be done, the outer end of the plug (see Fig. 4) is provided with a head, $f$, which is cut out, as shown in Fig. 5, leaving the slot $f^2$ of irregular shape to receive the hook-shaped lower end, $h$, of the lifting-screw $h^2$, extended through the nut $h^3$, the said nut provided with spanner projections $h^4$, being mounted upon the upper end of an annular or sleeve-like rest, $m$.

Fig. 3 shows the hook-shaped end of the screw as applied to the slotted head of the plug, the screw being turned sufficiently to enable the hooked portion $h$ to engage the under side of the head $f$ of the plug D. In this condition rotation of the nut $h^3$, mounted, as described, on the sleeve-like rest $m$, supported by the ring $a$, causes the screw $h^2$ to be moved in the direction of the arrow shown in Fig. 3, taking with it the plug D, the latter being thereby pulled forcibly out from within the hose and wedge-ring, leaving the latter, however, in position within the hose to co-operate with the outer ring or binder and form a clamp for the end of the hose. After the removal of the plug D the remaining portion of the hose-coupling is screwed into the open threaded end of the outer ring or binder in usual manner until it meets the wedge-ring.

We have shown a screw as the means to act upon the cap to force the plug into the hose; but we desire it to be understood that we may instead use any other well-known mechanical equivalents; but we prefer the screw.

We claim—

1. The binder-holder to hold the outer ring or binder and the plug, a follower resting thereon, and a cap to act upon both the plug and the follower, combined with means, substantially as described, to cause the cap to force the plug into the hose and cause the follower to at the same time act upon the wedge-ring and force it into the hose surrounding the plug, substantially as described.

2. The binder-holder to hold the outer ring or binder and the plug having a head and the annular sleeve-like rest $m$ and screw, combined with a nut to move the screw to effect the withdrawal of the plug from the hose end and the outer ring, substantially as described.

In testimony whereof we have signed our names to this specification in the presence of two subscribing witnesses.

EDWIN E. SIBLEY.
CHARLES ALLEN.

Witnesses:
G. W. GREGORY,
C. M. CONE.